(12) United States Patent
Chandra et al.

(10) Patent No.: US 7,477,281 B2
(45) Date of Patent: Jan. 13, 2009

(54) TRANSMISSION CONTROL IN MULTIPARTY CONFERENCE

(75) Inventors: Umesh Chandra, Allen, TX (US);
Cemil Azizoglu, Allen, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/030,086

(22) Filed: Jan. 7, 2005

(65) Prior Publication Data

US 2006/0098086 A1    May 11, 2006

(51) Int. Cl.
*H04N 7/14* (2006.01)
*H04L 12/16* (2006.01)

(52) U.S. Cl. ............... 348/14.09; 348/14.07; 348/14.08

(58) Field of Classification Search ... 348/14.01–14.09, 348/14.1, 14.11, 14.12, 14.13, 14.14; 709/204; 370/260, 261; 715/753; 379/802.01
See application file for complete search history.

(56) References Cited

U.S. PATENT DOCUMENTS

| | | | |
|---|---|---|---|
| 5,764,277 A | | 6/1998 | Loui et al. |
| 5,835,129 A * | | 11/1998 | Kumar ................... 348/14.09 |
| 5,953,050 A | | 9/1999 | Kamata et al. |
| 6,466,250 B1 * | | 10/2002 | Hein et al. ............... 348/14.16 |
| 6,604,129 B2 * | | 8/2003 | Slutsman et al. ............ 709/204 |
| 6,750,896 B2 * | | 6/2004 | McClure ................... 348/14.01 |
| 6,757,005 B1 | | 6/2004 | Elbaz et al. |
| 6,785,223 B1 * | | 8/2004 | Korpi et al. .................. 370/218 |
| 2003/0081750 A1 * | | 5/2003 | Berstis ................... 379/202.01 |
| 2004/0003040 A1 * | | 1/2004 | Beavers et al. .............. 709/204 |
| 2004/0252185 A1 * | | 12/2004 | Vernon et al. ............ 348/14.08 |
| 2005/0131744 A1 * | | 6/2005 | Brown et al. .................... 705/7 |
| 2005/0157164 A1 * | | 7/2005 | Eshkoli et al. ............ 348/14.07 |

FOREIGN PATENT DOCUMENTS

| | | |
|---|---|---|
| EP | 0 669 765 | 8/1995 |
| EP | 1 381 237 | 1/2004 |
| JP | 2000-312350 | * 11/2000 |

OTHER PUBLICATIONS

International Search Report dated May 23, 2006.

* cited by examiner

*Primary Examiner*—Melur Ramakrishnaiah
(74) *Attorney, Agent, or Firm*—Squire, Sanders & Dempsey, LLP

(57) ABSTRACT

The present invention relates to a method, terminal device and conference server device for providing a multiparty conference in a data network, wherein an individual presentation layout for participants in a composite video image is selected by a participant and transmitted to the conference serving function. Based on the layout information, a composite signal is generated so that the requesting participant has knowledge of the locations of individual participants' information streams, e.g. video stream, within the composite signal. Thereby, the participant can allocate specific information, such as names, titles or functions, to audio or video streams of the multiparty conference.

25 Claims, 3 Drawing Sheets

```
<switchStreamRequest id="1234">
    <stream method="Continuous Presence Mode"    dest="sip:bob@company.com">
        <contributor uri="sip:john@company.com" ssrc="6789" pos-x ="1" pos-y ="1"/>
        <contributor uri="sip:alice@company.com" ssrc="34" pos-x ="1" pos-y ="2"/>
        <contributor uri="sip:mary@company.com" ssrc="345" pos-x ="2" pos-y ="1"/>
        <contributor uri="sip:tom@company.com" ssrc="3456" pos-x ="2" pos-y ="2"/>
    </stream>
</switchStreamRequest>
```

Fig. 4

TRANSMISSION CONTROL IN MULTIPARTY CONFERENCE

FIELD OF THE INVENTION

The present invention relates to a control method, terminal device, conference server device and multiparty conference system for requesting layout of a composite signal of a multiparty conference.

BACKGROUND OF THE INVENTION

In order to achieve access independence and to maintain a smooth interoperation with wired terminals across the Internet, an Internet Protocol Multimedia Subsystem (IMS) core network, as specified e.g. in the 3GGP (Third Generation Partnership Project) specification TS 23.228, has been developed to be conformant to IETF (Internet Engineering Task Force) "Internet Standards". The IMS enables network operators of mobile or cellular networks to offer their subscribers multimedia services, based on and built upon Internet applications, services and protocols. The intention is to develop such services by mobile network operators and other third party suppliers including those in the Internet space using the mechanisms provided by the Internet and the IMS. The IMS thus enables conversion of, and access to, voice, video, messaging, data and web-based technologies for wireless users, and combines the growth of the Internet with the growth in mobile communications. In IMS the Session Initiation Protocol (SIP) is used as the main session control protocol between end user equipments and Call State Control Functions (CSCFs) located in the IMS. SIP enables network operators to provide new features for end users such as dialing with the use of SIP Uniform Resource Indicators (SIP URIs).

For example IETF is working on a SIP conferencing service. The goal is to define how conferencing type of services can be established between terminals, which can be used as a SIP user agent. To this end, an XCON working group has been in IETF, which is responsible for developing standardized suite of protocols for tightly coupled multimedia conferences. As part of the XCON working group protocols for conference control, media control and floor control would be developed and standardized. Multimedia conferences may include any combination of different media types.

In multiparty conferencing, media control protocol enables each participant of the conference to choose the media stream it wants to hear or view. This enhances the end users' experience in multiparty conferencing in that they can view or hear a particular participant of the conference. Each participant of the conference is allowed to send requests to the conferencing server requesting to view a particular participant of the conference or to view multiple participants of the conference in desired layout format like mosaic or continuous presence mode. When the conferencing server receives such a request to view multiple participants at the same time from an end user or end point, it constructs a composite video frame of multiple participants and sends out the video frame to the end participant.

However, the end participant has no knowledge of participants that are provided in the composite video frame. For example, if the conferencing server sends a 2×2 video frame of four different participants to a particular participant of the conference, the endpoint cannot determine where the participants are located in that composite video frame. There is thus no way for an end user to display at its screen titles allocated to individual images in the composite video frame. Hence, presently in multiparty video conferencing systems of circuit switched or packet switched networks no mechanism is given to a participant to request or specify a location of a particular participant's video or multiple participants' video in a composite video frame for the conferencing server. Currently, the conferencing server sends a composite video frame, for example in a continuous presence mode, if the conferencing server is configured in this particular manner. Besides this, there is no other way a participant can request particular video streams in a particular format or order from the conferencing server.

SUMMARY OF THE INVENTION

It is therefore an object of the present invention to provide a method and system for controlling transmission in a multiparty videoconference system, by means of which a participant can determine the layout of a composite video frame of a multiparty video conferencing service.

This objective is achieved by a method of controlling layout of a composite signal of a multiparty conference, said method comprising the steps of:
  generating a list of participants of said multiparty video conference in response to information on participants received from a conference serving function
  selecting at least one participant from the list of participants to be included in said composite signal;
  selecting a layout for the selected participants of said multiparty conference at a user terminal of a participant; and
  transmitting to said conference serving function a request with a layout information indicating said selected layout.

Furthermore, the above object is achieved by a terminal device for providing connection to a data network having a multiparty conferencing service, said terminal device comprising:
  receiving means for receiving information on participants of a multiparty conference;
  selecting means for selecting a presentation layout of an information stream of at least one of said participants of said multiparty conferencing service; and
  generating means for generating a request with a layout information indicating said selected presentation layout.

Finally, the above object is achieved by a conference server device for providing a multiparty video conference in a communication network, said conference server device comprising frame construction means for arranging image information on participants of said multiparty conference in a composite signal frame in response to a position information provided in a request received from a participant.

Accordingly, a mechanism is given, by means of which a participant of a multiparty conference can indicate to the conferencing server a desired layout (e.g. screen or other output positions) of each or a predetermined number of participants' information stream in a composite signal. In general, the proposed solution allows an end user to get knowledge about the location of an information stream of a particular participant in the composite signal. Thereby, presentation of video, audio or other user-related information streams of individual participants at the terminal device of a participant can be modified or enhanced individually.

In a specific multiparty videoconference implementation, the layout information may indicate coordinates for images of the participants in a two-dimensional coordinate system. In particular, the layout information may comprise a tuple of horizontal and vertical coordinates of a display matrix. Thereby, the participant can indicate in its request to the conferencing server, where each participant should be placed in the display matrix. In the simple implementation of a tuple as layout information, only two numbers would be required to be indicated in the request as additional attributes or other parameters. Of course, any other layout information defining the position of images on a display screen could be used, such as consecutive numbering, polar coordinates (e.g. based on the center of the screen) or predefined numbers or characters indicating specific positions on the screen. The layout information may as well relate to other information streams, such as audio streams or control streams.

The request may be a request message of a media control protocol. As an example, the layout information may be transmitted as an XML attribute of an advanced video template.

Furthermore, the layout selection may be performed automatically by the user terminal.

Additionally, a step may be provided for adding a label to information streams of the selected participants, in accordance with the layout information. This label may comprise at least one of URI name, part of URI name, item retrieved from an address book, or a manually-defined label.

Moreover, an acknowledgement step may be provided for transmitting an acknowledgement in response to the request. This acknowledgement may indicate at least one of success or failure of the request or layout of the information streams in the composite signal.

The terminal device may comprise displaying means for displaying the composite signal. Additionally, it may comprise labeling means for labeling at least one of the information streams displayed on the displaying means. The labeling means may be adapted to label the information streams by at least one of URI name, part of URI name, item retrieved from an address book, or manually-defined label.

The conference server may comprise acknowledging means for acknowledging the request received from the participant. The acknowledging means may be adapted to indicate at least one of success or failure of the request or positions of the information streams in the composite signal.

Other advantageous modifications or developments can be gathered from the dependent claims.

BRIEF DESCRIPTION OF THE DRAWINGS

The present invention will now be described based on a preferred embodiment with reference to the accompanying drawings, in which:

FIG. 4 shows an example of a request message in XML notation according to the preferred embodiment.

DESCRIPTION OF THE PREFERRED EMBODIMENT

In the following, a preferred embodiment of the present invention will be described in connection with a SIP (Session Initiation Protocol) conferencing frame work.

Figure 1:
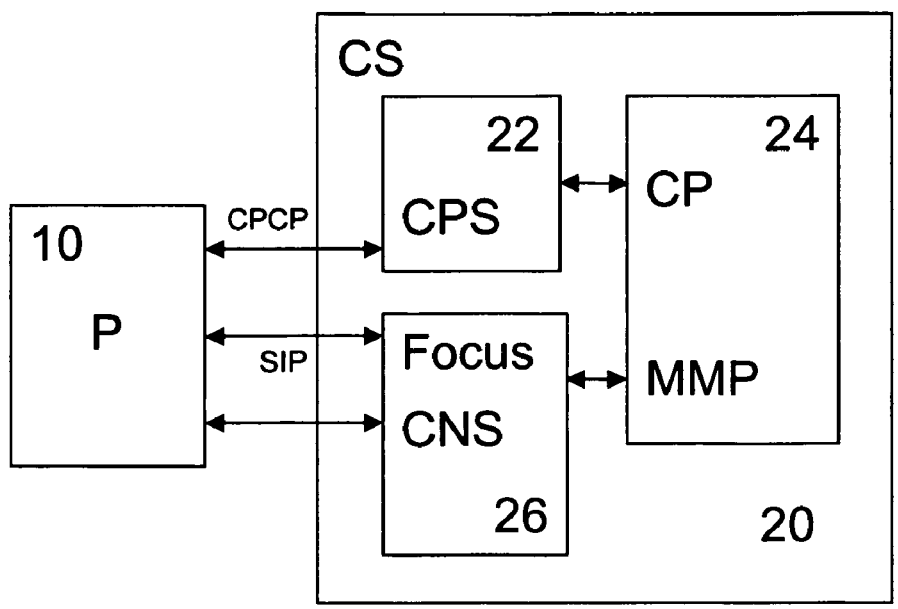
FIG. 1 shows a schematic block diagram of a conference server with conference functions according to the preferred embodiment.

FIG. 1 shows basic conference functions of the SIP conferencing frame work where a participant 10 is connected to a conference server 20. The conference server 20 may comprise a conference policy server function or unit 22, a conference policy and membership & media policy function or unit 24, and a conference notification service function or unit 26.

The conference notification service unit 26 comprises a focus functionality, which is a SIP user agent addressed by a conference URI and identifying a conference. The conference policy server unit 22 comprises a logical function which can store and manipulate a conference policy allocated to an individual conference. The conference policy can be manipulated by clients (e.g. the participant 10) by using e.g. a Conference Policy Control Protocol (CPCP).

When a conference is created, it is instantiated from a template. The template describes what controls are available for the client to manipulate the media. The template can have parameters that are set when it is instantiated to allow one template to describe variations of similar flow models. In general, a conference consists of several participants and multiple streams of media flowing between the participant and a conference mixer provided in the conference server 20. A conference has allocated a list of participants and each participant has allocated a set of controls that he can manipulate. Furthermore, each conference has allocated a list of streams, wherein each stream is provided with attributes such as name, type, priority and list of contributing participants. A protocol between the client, e.g. the participant 10, and the conference server 20 allows the client to get the semantic information in the conference, find out when it changes, and make changes to it. Templates define models for the reception, manipulation and transmission of streams. A template provides enough information so that the client can intelligently render a useful graphical user interface (GUI) to the end user to manipulate the model. There is a registry of well-known templates, but the conference server can define new ones. As an example, a template for a very basic audio conference may indicate that there is one audio stream for each participant, and one output mixer stream. Each participant in the stream has a single binary control for muting purposes and only a participant role can be used.

A SIP event package for conference state allows users to subscribe to a conference URI, so that notifications are sent by the conference notification service unit 26 about changes in the membership of this conference, the status of users participation in the conference, and side bars in the conference. The focus forms a central point of control and authorization to enforce specific media and membership relationships and provide an accurate roster of participants. The media mixing or combining function of a tightly-coupled conference does not necessarily has to be performed centrally.

An Extensible Mark-up Language (XML) Configuration Access Protocol (XCAP) can be used for conference policy manipulation. CPCP can be transported using XCAP or any other transport protocol.

According to the preferred embodiment, a functionality or mechanism is provided for manipulating the conference and, in particular, a conference mixer or conference mixing functionality which controls combination of media for each participant in the conference. The conference mixing functionality, which is part of the conference policy and membership & media policy unit 24, may have constraints on what media flows are possible and which input devices can be used by participants to manipulate the conference.

In particular, according to the preferred embodiment, a mechanism is proposed where the end participant 10 of a multiparty video conferencing in a centralized conferencing mode can indicate to the conferencing server 20 the position of each participant's information stream in a composite video frame, as an example of a desired presentation layout. For example, if an end participant whishes to get a mixed video stream of four other participants of the conference, it can indicate in a request to a conferencing server, where the video stream of each participant should be placed in the composite video frame to obtain a desired display position, e.g. one participant (John) in a top left position, another participant (Alice) in a top right position, a further participant (Mary) in a bottom left position, and a last participant (Tom) in a bottom right position. The position can be represented using for example a two-dimensional coordinate system, wherein the first element of a tuple may represent the row or x-position and the second element of the tuple may represent the column or y-position. These elements are indicated as position information in the request message, e.g. as attributes pos-x and pos-y.

Figure 2:
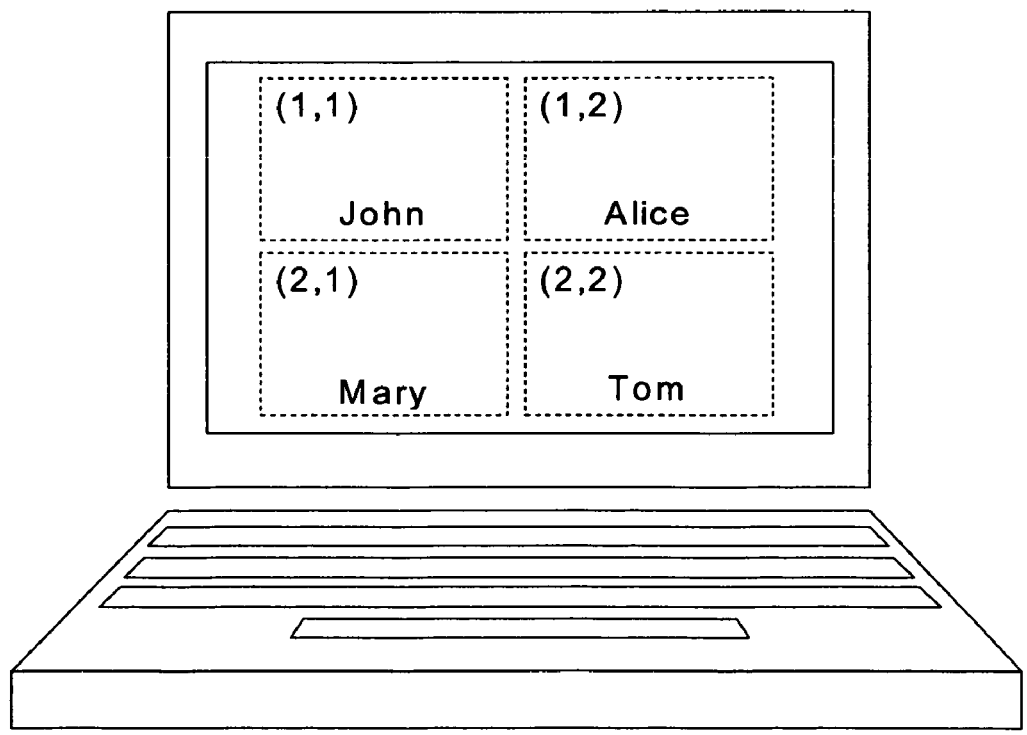
FIG. 2 shows an example of an image display at a terminal device according to the preferred embodiment.

FIG. 2 shows an example of a terminal device (e.g. laptop) with the above 2×2 matrix display, wherein the position of the image of the participant "John" is represented by the tuple (1, 1), the position of the image of the participant "Alice" is indicated by the tuple (1, 2), the position of the image of the participant "Mary" is indicated by the tuple (2, 1), and the position of the image of the participant "Tom" is indicated by the tuple (2, 2). In practice, the dotted frames on the screen of FIG. 2 represent regions, where the video images of the participants are displayed. The tuples must not be included in the frames and the text portions "John", "Alice", "Mary", and "Tom" may be replaced by titles and/or other designations of the participants. Of course, any other geometrical arrangement of the images could be used together with a suitable position indication.

Consequently, when the endpoint of the participant 10 receives the composite video from the conferencing server 20, it has knowledge about each participant's location on the frame and can display appropriate titles, names and other dedicated information to enhance user friendliness.

In SIP based multiparty conferencing, the participants of the conference get a notification indicating the state of the conference. This state of the conference indicates who has joined the conference and who has left the conference. The notification is issued by the conference notification service unit 26 of the conference server 20. In this manner, each participant or endpoint receives information on participants and can construct a list of participants who are present in the conference. When an end user wishes to view and/or hear a particular conference participant, it can clearly indicate it to the conference server 20. Furthermore, if the participant 10 wishes to get a composite video consisting of multiple participants, it can send a corresponding request message to the conference server 20. This request message may be part of the media control protocol.

Figure 3:
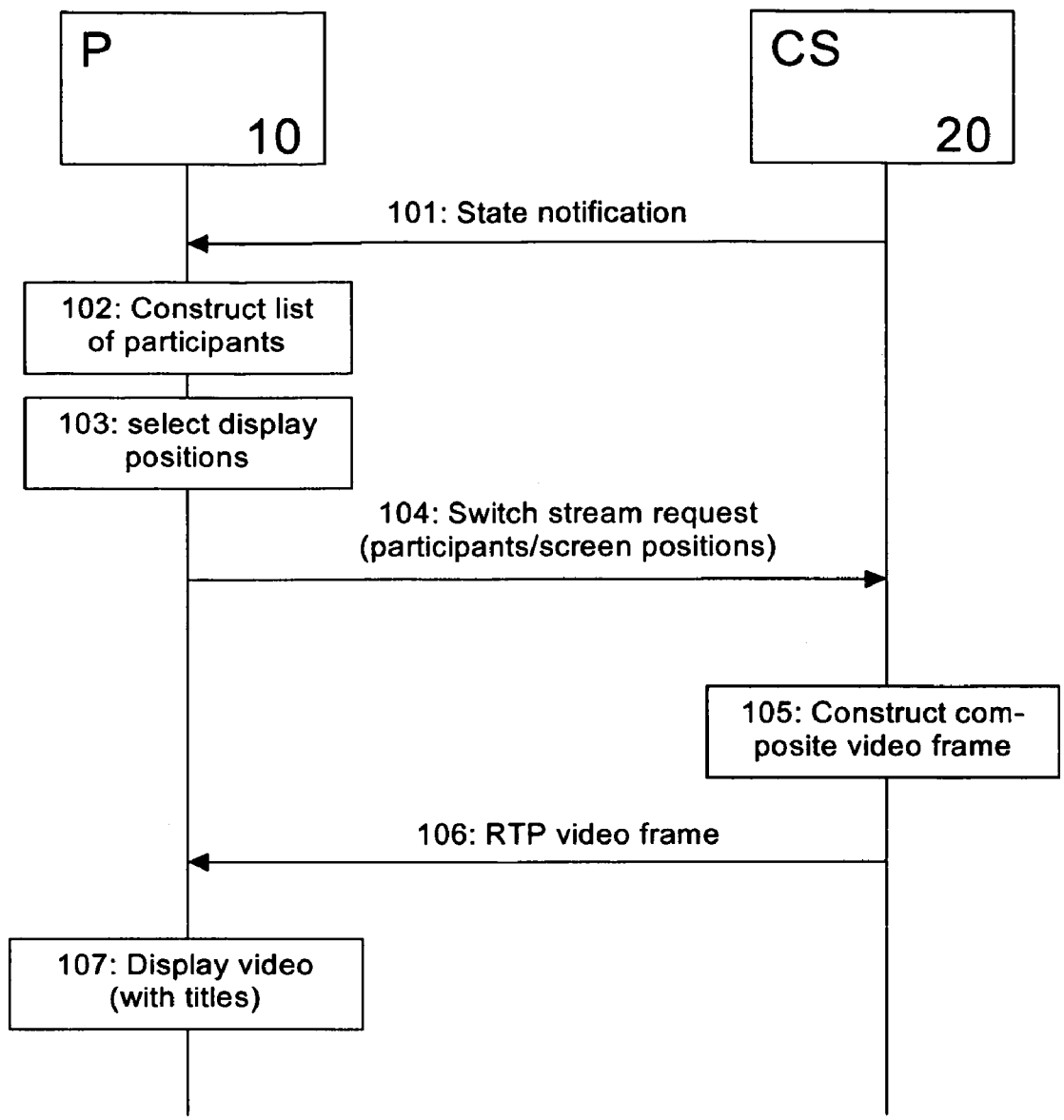
FIG. 3 shows a processing and signaling diagram according to the preferred embodiment.

FIG. 3 shows a schematic processing and signaling diagram showing the proposed mechanism according to the preferred embodiment. In step 101, a state notification is send from the conference server 20 to the participant 10. Then, in step 102, the participant 10 constructs or generates a list of participants, based on which desired display positions for selected participants are selected. These display positions are coded in a corresponding position information, such as the above tuples, and are added to a request message generated at the participant 10 and thus comprising participants and screen positions. As an example, this request message may be a switch stream request of the media control protocol. The request message is routed in step 104 to the conference server 20. When the conference server 20 receives this request message, it generates or constructs a composite video frame based on the inputs or attributes indicated in the request message (step 105). The mixing function of the conference server 20 creates the composite video to arrange video frames relating to the different specified participants in the specified screen positions. The conference server 20 then sends this video frame to the end participants in step 106, using a corresponding transport protocol, such as RTP/UDP (Real-Time Transport Protocol/User Datagram Protocol) in IP-based multiparty video conferencing. When the participant (end point, end user) receives this video frame, it can display the video and optionally also display titles with the name or SIP URL (Uniform Resource Locator) of each of the participants, e.g. as indicated in FIG. 2.

Thereby, the participant 10 or end point knows whose video streams are mixed in the composite video frame and in which position each participant's video is located. In case of the 2×2 matrix, the conference mixer would create a composite video frame of four participants and position them as requested by the participant 10. If the participant 10 decides to change the position of these four participants, while the participants remain the same, he sends a request to the mixer of the conferencing server 20. In response, the mixer would then send the new composite video, based on the new position information.

FIG. 4 shows an XML notation of an example of a request message sent from the participant 10 to the conferencing server 20 in order to indicate the position information. In the present example, the participant 10 whishes to watch four other participants in one composite video. Thus, he denotes or indicates the position of each user in the request message. According to this example, the request message is part of the media control protocol which enables endpoints to request media control operations, like request stream, mixing streams, etc. from the conference server (i.e. conference mixer functionality). In the example of FIG. 4, the participant "Bob" is requesting from the conference server 20 a composite video in continuous presence mode. In the video stream he whishes to receive, he specified that he wants to view the video streams of the participants "John", "Alice", "Mary", and "Bob", who are all participants of the same conference. The mixer functionality of the conference server 20 mixes the input video streams of the specified participants and constructs one video frame. In the request message, the participant "Bob" also specifies positions of each participant in the composite video frame. For example, he wants to display the images of the selected participants in accordance with the example of FIG. 2. Consequently, the mixer functionality of the conference server 20 constructs the composite video frame from the corresponding four input video streams and creates it in a manner as indicated in the request message received from the participant 10. When the participant 10 gets this composite video frame from the conference server 20, it knows which part of the composite video frame is allocated to which participant and can display images and add corresponding titles. Thus, end users as well as positions of end users can be simultaneously requested.

In summary, the present invention relates to a method, terminal device and conference server device for providing a multiparty conference in a communication network, wherein an individual layout for information streams of participants is selected by a participant and transmitted to the conference serving function. Based on the layout information, a composite signal is generated so that the requesting participant has knowledge e.g. of the locations of an individual participant's information stream, e.g. video stream, within the composite signal. Thereby, the participant can allocate specific information, such as names, titles or functions, to audio, video or other information streams of the multiparty conference. The functionalities and blocks described in the preferred embodiment may be implemented as concrete hardware elements or as software routines controlling a computer or processor device at the terminal device of the participant 10 or at the conference server 20.

As an additional measure, a conference serving function may be provided for acknowledging a request message received from a user. In the acknowledgement (which is not shown in FIG. 3), the conference serving function may indicate whether information streams are arranged according to the request. In addition, the acknowledgement may include the positions of the information streams, for example, in case the request cannot be fulfilled. If no acknowledgement is received at a terminal device of the participant 10, it may assume that the conference serving function does not support the functionality described above and labels may not be displayed.

It is noted that the present invention is not restricted to the above preferred embodiment but can be used in any conference system for defining the layout of a participants' information stream in a composite signal. Furthermore, the way of designating the layout may vary based on the output options at the terminal device of the end user or participant. In case of a composite audio signal or control signal, the layout information may specify a kind or location of an output device, e.g. loudspeaker, at the concerned terminal device. The designation may even be achieved directly based on the position or location of the information stream within the composite signal transmitted by the conference server. The preferred embodiment may thus vary within the scope of the attached claims.

The invention claimed is:

1. A method, comprising:
  generating a list of participants of said multiparty conference in response to information on participants received from a conference serving function;
  selecting at least one participant from said participant list to be included in a composite signal;
  creating, selecting or modifying a presentation layout for said selected participants of said multiparty conference at a user terminal of a participant by defining a desired position of each selected participant on a display screen;
  transmitting to said conference serving function a request with layout information indicating said selected presentation layout;
  adding a label to information streams of said selected participants according to said layout information, wherein said label comprises at least one of a uniform resource identifier name, part of a uniform resource identifier name, and an item retrieved from an address book; and
  providing a presentation layout of a composite signal of the multiparty conference.

2. A method according to claim 1, further comprising generating said composite signal at said conference serving function based on said layout information.

3. A method according to claim 1, wherein said multiparty conference is a multiparty videoconference and said presentation layout information indicates coordinates for images of said selected participants in a two-dimensional coordinate system.

4. A method according to claim 3, wherein said layout information comprises a tuple of horizontal and vertical coordinates of a display matrix.

5. A method according to claim 1, wherein said request is a request message of a media control protocol.

6. A method according to claim 4, wherein said layout information is transmitted as an extensible-markup language attribute of an advanced video template.

7. A method according to claim 1, wherein said presentation layout selection is automatically performed by said user terminal.

8. A method according to claim 1, further comprising transmitting an acknowledgement to said request.

9. A method according to claim 8, wherein said acknowledgement indicates at least one of a success or a failure of said request in said composite signal.

10. A method according to claim 1, further comprising repeating the participant selection, the presentation layout selection and the transmitting, for redefining said composite signal.

11. An apparatus, comprising:
  receiving means for receiving information on participants of a multiparty conference;
  creating/selecting/modifying means for creating, selecting or modifying a presentation layout of an information stream of at least one of said participants of said multiparty conferencing service by defining a desired position of each selected participant on a display screen;
  generating means for generating a request with a layout information indicating said selected presentation layout;
  labeling means for labeling at least one information stream displayed on said displaying means wherein said labeling means is configured to label said at least one information stream with at least one of a uniform resource identifier name, part of a uniform resource identifier name, and an item retrieved from an address book.

12. An apparatus according to claim 11, further comprising a display means for displaying a composite signal.

13. An apparatus according to claim 11, wherein said generating means is configured to generate said layout information as an extensible markup language attribute of a video template.

14. An apparatus according to claim 11, wherein said layout information comprises horizontal and vertical coordinates of a display matrix.

15. An apparatus of claim 11, further comprising a conference server, wherein said conference server comprises a signal constructor configured to arrange information streams of participants of said multiparty conference in a composite signal in response to the layout information in a request received from a participant.

16. An apparatus, comprising:
  receiving means for receiving information on participants of a multiparty conference; and
  signal construction means for arranging information streams of the participants of said multiparty conference in a composite signal in response to a layout information in a request received from one of said participants,
  wherein the layout information includes defined desired positions of each selected participants,
  wherein the signal construction means is further configured for adding a label to information streams of said selected participants according to said layout information,
  wherein said label comprises at least one of a uniform resource identifier name, part of a uniform resource identifier name, and an item retrieved from an address book.

17. An apparatus according to claim 16, wherein said layout information is received as an extensible-markup language attribute of a video template.

18. An apparatus according to claim 16, wherein said information streams of said participants are video streams.

19. An apparatus according to claim 16, further comprising acknowledging module configured to acknowledge said request received from said participant.

20. An apparatus according to claim 19, wherein said acknowledging module is further configured to indicate at least one of a success or a failure of said request.

21. A computer-readable medium having computer-executable components comprising:
   generating a list of participants of said multiparty conference in response to information on participants received from a conference serving function;
   selecting at least one participant from said participant list to be included in a composite signal;
   creating, selecting or modifying a presentation layout for said selected participants of said multiparty conference at a user terminal of a participant by defining a desired position of each selected participant on a display screen;
   transmitting to said conference serving function a request with layout information indicating said selected presentation layout;
   adding a label to information streams of said selected participants according to said layout information, wherein said label comprises at least one of a uniform resource identifier name, part of an uniform resource identifier name, and an item retrieved from an address book; and
   providing a presentation layout of a composite signal of the multiparty conference.

22. An apparatus, comprising:
   a receiver configured to receive information on participants of a multiparty conference;
   a selector configured to create, select, or modify a presentation layout of an information stream of at least one of said participants of said multiparty conferencing service by defining a desired position of each selected participant on a display screen; and
   a generator configured to generate a request with layout information indicating said selected presentation layout
   a labeler configured to label at least one information stream displayed on said display module,
   wherein said labeler is configured to label said at least one information stream with at least one of a uniform resource identifier name, part of a uniform resource identifier name, and an item retrieved from an address book.

23. An apparatus according to claim 22, further comprising a display module configured to display a composite signal.

24. An apparatus according to claim 22, wherein said generator is configured to generate said layout information as an extensible markup language attribute of a video template.

25. An apparatus according to claim 22, wherein said layout information comprises horizontal and vertical coordinates of a display matrix.

* * * * *